United States Patent
Peddada (10) Patent No.: US 7,376,754 B2
(45) Date of Patent: May 20, 2008

(54) SYSTEM AND METHOD FOR COMMUNICATIONS BETWEEN SERVERS IN A CLUSTER

(75) Inventor: Prasad Peddada, Albany, CA (US)

(73) Assignee: BEA Systems, Inc., San Jose, CA (US)

( * ) Notice: Subject to any disclaimer, the term of this patent is extended or adjusted under 35 U.S.C. 154(b) by 727 days.

(21) Appl. No.: 10/789,138

(22) Filed: Feb. 27, 2004

(65) Prior Publication Data

US 2005/0021690 A1    Jan. 27, 2005

Related U.S. Application Data

(60) Provisional application No. 60/450,294, filed on Feb. 27, 2003.

(51) Int. Cl.
*G06F 15/16* (2006.01)
(52) U.S. Cl. ............... 709/248; 709/203; 709/219; 709/224; 709/229; 709/232; 707/10; 707/201
(58) Field of Classification Search ........... 709/203, 709/224, 219, 229, 248, 201, 217, 232; 707/10, 707/201
See application file for complete search history.

(56) References Cited

U.S. PATENT DOCUMENTS

| | | | |
|---|---|---|---|
| 5,452,448 A | | 9/1995 | Sakuraba et al. |
| 6,006,254 A | * | 12/1999 | Waters et al. ............ 709/205 |
| 6,256,634 B1 | * | 7/2001 | Moshaiov et al. ......... 707/100 |
| 6,577,599 B1 | * | 6/2003 | Gupta et al. ............ 370/236 |
| 6,782,398 B1 | * | 8/2004 | Bahl ...................... 707/200 |
| 6,912,569 B1 | * | 6/2005 | Sharma et al. ........... 709/223 |
| 6,965,938 B1 | * | 11/2005 | Beasley et al. .......... 709/229 |
| 2002/0023173 A1 | * | 2/2002 | Jacobs et al. ............ 709/245 |
| 2003/0110172 A1 | | 6/2003 | Selman et al. |
| 2003/0217119 A1 | * | 11/2003 | Raman et al. ........... 709/219 |
| 2004/0025079 A1 | * | 2/2004 | Srinivasan et al. ........ 714/13 |
| 2006/0015574 A1 | * | 1/2006 | Seed et al. .............. 709/219 |

OTHER PUBLICATIONS

International Search Report, in connection with PCT/US2004/06215 dated May 12, 2006, 9 pages.

* cited by examiner

*Primary Examiner*—Oanh Duong
(74) *Attorney, Agent, or Firm*—Fliesler Meyer LLP (57) ABSTRACT

A system and method for communications between servers in a cluster. The system allows for point-to-point messaging to be used in a clustered environment to provide communication of services provided by each server or member of that cluster. Each server or member within the cluster advertises its services as before. If one of the receiving servers misses an advertisement, i.e. it becomes out-of-sync with the sending server, then the second (receiving) server makes a reliable point-to-point request to the first (sending) server asking for the missed services.

24 Claims, 5 Drawing Sheets

(Point-to-Point Update)

Figure 1
(Multicast Update)

Figure 2
(Multicast Update)

Figure 3
(Point-to-Point Update)

Figure 5

SYSTEM AND METHOD FOR COMMUNICATIONS BETWEEN SERVERS IN A CLUSTER

CLAIM OF PRIORITY

This application claims priority to U.S. Provisional Patent Application 60/450,294, filed Feb. 27, 2003 entitled "SYSTEM AND METHOD FOR COMMUNICATIONS BETWEEN SERVERS IN A CLUSTER", and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to application servers and clusters of application servers, and particularly to a system and method for communications between servers in a cluster.

BACKGROUND

In the field of application servers and distributed systems, clusters of servers are often used to provide highly available and scalable resources. One example of an application server is the WebLogic Server from BEA Systems, Inc. A cluster (such as a WebLogic Server cluster) comprises multiple server instances running simultaneously and working together to provide increased scalability and reliability. A cluster appears to clients to be a single server. The server instances that constitute a cluster can run on the same machine, or be located on different machines. A cluster's capacity can be increased by adding additional server instances to the cluster on an existing machine, or by adding machines to the cluster to host the incremental server instances. Each server instance in a cluster must typically run the same version of the server product.

In terms of how a cluster relates to the environment in which the application server exists, a cluster is usually part of a particular server (e.g. WebLogic Server) domain. A domain is an interrelated set of resources that are managed as a unit. A domain includes one or more server instances, which can be clustered, non-clustered, or a combination of clustered and non-clustered instances. A domain can include multiple clusters. A domain also contains the application components deployed in the domain, and the resources and services required by those application components and the server instances in the domain. Examples of the resources and services used by applications and server instances include machine definitions, optional network channels, connectors, startup classes, EJB's, JSPs, etc. An administrator can use a variety of criteria for organizing server instances into domains. For instance, they might choose to allocate resources to multiple domains based on logical divisions of the hosted application, geographical considerations, or the number or complexity of the resources under management.

In a WebLogic domain, one WebLogic Server instance typically acts as the Administration Server—the server instance which configures, manages, and monitors all other server instances and resources in the domain. If a domain contains multiple clusters, each server in the domain has the same Administration Server.

Clustered server instances behave similarly to non-clustered instances, except that they provide failover and load balancing. The process and tools used to configure clustered server instances are the same as those used to configure non-clustered instances. A server cluster provides the following benefits and features:

Scalability—The capacity of an application deployed to a cluster can be increased dynamically to meet demand. Server instances can be added to a cluster without interruption of service—the application continues to run without impact to clients and end users.

High-Availability—In a cluster, application processing can continue when a server instance fails. Application components are "clustered" by deploying them on multiple server instances in the cluster—so, if a server instance on which a component is running fails, another server instance on which that component is deployed can continue application processing.

Failover—Failover means that when an application component (typically referred to as an "service" in the following sections) doing a particular "job"—some set of processing tasks—becomes unavailable for any reason, a copy of the failed service finishes the job. For the new service to be able to take over for the failed service there must be a copy of the failed service available to take over the job. There must also be information, available to other services and the program that manages failover, defining the location and operational status of all services—so that it can be determined that the first service failed before finishing its job. There must also be information, available to other services and the program that manages failover, about the progress of jobs in process—so that a service taking over an interrupted job knows how much of the job was completed before the first service failed, for example, what data has been changed, and what steps in the process were completed. Many application servers, including WebLogic Server, use standards-based communication techniques and facilities—multicast, IP sockets, and the Java Naming and Directory Interface (JNDI)—to share and maintain information about the availability of services in a cluster. These techniques allow the server to determine that a service stopped before finishing its job, and where there is a copy of the service to complete the job that was interrupted. Information about what has been done on a job is called state. WebLogic Server maintains information about state using techniques called session replication and replica-aware stubs. When a particular service unexpectedly stops doing its job, replication techniques enable a copy of the service pick up where the failed service stopped, and finish the job.

Load Balancing—Load balancing is the even distribution of jobs and associated communications across the computing and networking resources in the application server environment. For load balancing to occur there must be multiple copies of a service that can do a particular job. Information about the location and operational status of all services must also be available. In addition, WebLogic Server allows services to be clustered—deployed on multiple server instances—so that there are alternative services to do the same job. WebLogic Server shares and maintains the availability and location of deployed services using multicast, IP sockets, and JNDI.

Cluster members must typically keep in touch with one another to ensure consistency throughout the cluster. This is particularly relevant in keeping track of the various resources, provided by the cluster, including the fact that some resources may be provided by certain cluster members, while other cluster members provide a different set of resources, services, etc. Many application server cluster products, including for example BEA's WebLogic server product maintain a cluster-wide JNDI tree or naming service that keeps track of all of the available resources and services in the cluster. Each cluster member in the cluster maintains its own naming service whose view mimics that of the global tree. In this manner, when a client (or server, or any other process) accesses a server in the cluster they get the same set of available resources, which attempts to provide consistency throughout the cluster. During normal use each server within the cluster binds its resources to its internal naming service, which is then replicated (advertised) to all of the other cluster members. For example, if a server A is providing a particular service, then information about this server is first bound to server A's naming service (for example its JNDI tree), and from there is replicated to the other servers.

Typically, the approach used to replicate information from one cluster member or server to another server within the cluster is to multicast the information. Using multicast, information about all of a servers resources, services, etc. is multicast to each other member of the cluster. However, mutlicast is an unreliable transport mechanism. The packet of information could be intercepted or dropped along the way, resulting in one server having a different view of the naming service from the view at another server. As such, this impinges on the consistency throughout the cluster.

Traditionally, there are two primary methods to make the multicast process more reliable at a higher level. A first approach is for the second (receiving) server to issue a request (for example a NAK request) to the first (sending) server, saying "I missed an update packet—please resend it". In return the second server will be sent the missing update. Another approach is for the first server to send an aggregated view (a statedump) of all of its resources and services to the second server. The statedump describes the aggregate view of the services provided by a server. Large packets of multicast messages exchanged between servers in a cluster can potentially destabilize the cluster. Frequent resend requests for service advertisements can quickly overflow the operating system message buffers, causing stability problems. As the number of services provided by a server increase, so does the size of the statedump. Coupled with the increasing of a cluster, this could lead to longer startup time and the time each server takes to stabilize in a cluster. The need to send frequent large multicast messages also impacts the cluster scalability and the performance.

SUMMARY

The invention provides a system and method for communications between servers in a cluster. The system allows for point-to-point messaging to be used in a clustered environment to provide communication of services provided by each server or member of that cluster. Each server or member within the cluster sends out a single advertisement as before. If one of the receiving servers misses an advertisement, i.e. it becomes out-of-sync with the sending server, then the second (receiving) server makes a reliable point-to-point request to the first (sending) server asking for everything it missed. In accordance with one embodiment this request is in the form of an http request from the receiving server to the sending server. This process ensures the message buffers are not overflowed, which in turn improves the stability of the cluster. The result is enhanced overall cluster stability and scalability.

DETAILED DESCRIPTION

As disclosed herein, and embodiment of the present invention provides a system and method for communications between servers in a cluster. Generally described, the invention provides a system for point-to-point messaging that can be used with or within application servers in a clustered environment to provide communication of services provided by each server or member of that cluster. Each server or member within the cluster sends out a single advertisement as before. If one of the receiving servers misses an advertisement, i.e. it becomes out-of-sync with the sending server, then the second (receiving) server makes a reliable point-to-point request to the first (sending) server asking for everything it missed. In accordance with one embodiment this request is in the form of an http request from the receiving server to the sending server. This process ensures the message buffers are not overflowed. The result is enhanced overall cluster stability and scalability.

In addition, the invention provides a useful mechanism for adding new servers as members into the cluster. In the past, when a new server joined the cluster, it would have to issue requests (NAK's) to each of the servers already in the cluster requesting information from each server as to the services it provides. If there are N servers already in the cluster, and each update is M bytes in size, then this would require N×M bytes in data transfer, and would take a long time for the new server to initialize. Using the present invention, a new server need only wait for a few seconds to see who else is in the cluster. The new server can then make a http request to one node or member to retrieve a copy of the services provided by that server. The result is a reduction in the total number and size of messages that need to be transferred to and from the new server.

Figure 1:
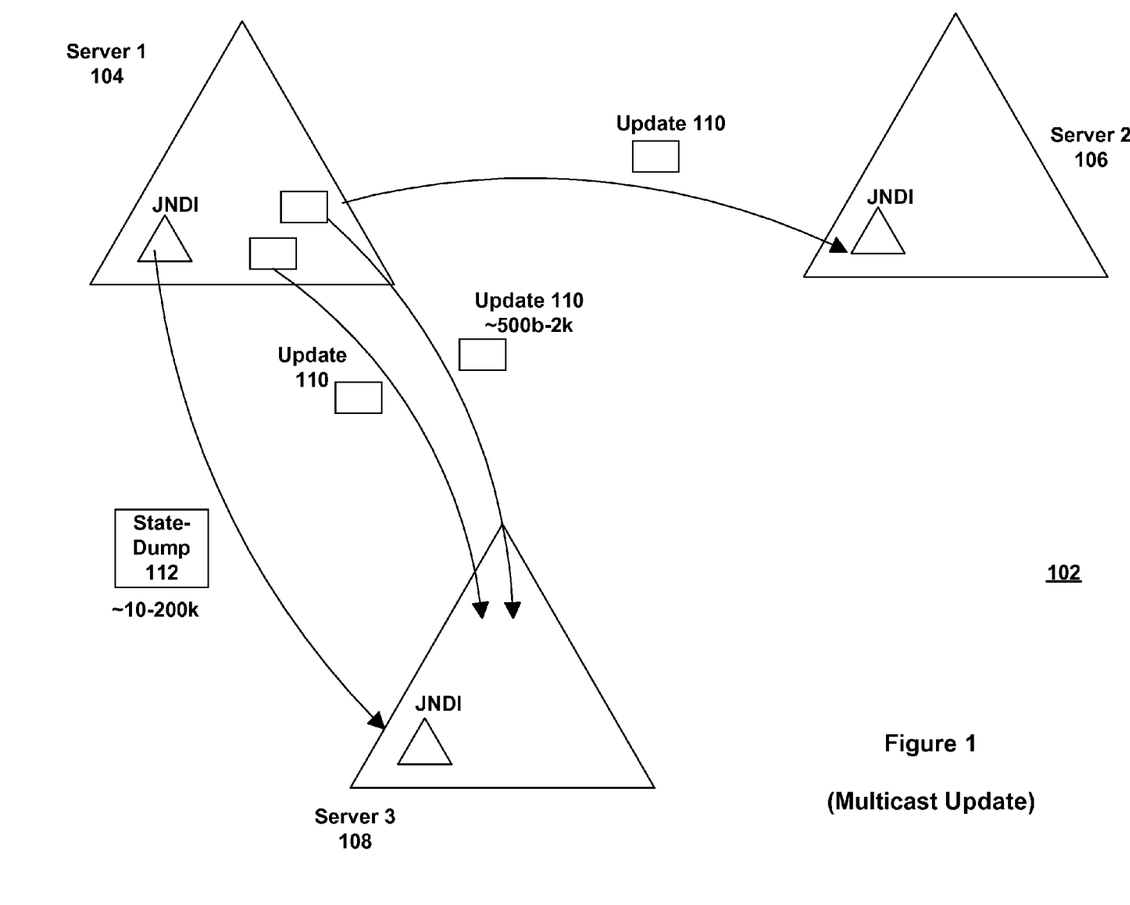
FIG. 1 shows an illustration of an update mechanism between servers in a cluster, which uses multicast messaging.

FIG. 1 shows an illustration of an update mechanism 102 between servers in a cluster, which uses multicast messaging. As shown in FIG. 1, server 1 (104) must update all of the other servers 106, 108 in the cluster (in this example server 2 and server 3) on a regular basis. Each update 110 is typically of the order of 500 bytes to 2 k bytes. Updates are sent by multicast to each server in the cluster, and the total number of multicast messages increases proportionally with an increase in cluster size. Since multicast is not a reliable protocol, if an update is missed, each server (in this case server 2 and server 3) which misses the latest update must send a request to server 1 asking it to resend the update. A problem arises when the servers message buffers begin to overflow, with a resulting loss in cluster performance. A server may choose to send an aggregated view of the services listed in the naming service or JNDI tree at that server (a statedump). However, these aggregated views or statedumps are typically of the order of 10 k-200 k bytes. Communicating such large packets of data also diminishes cluster performance.

Figure 2:
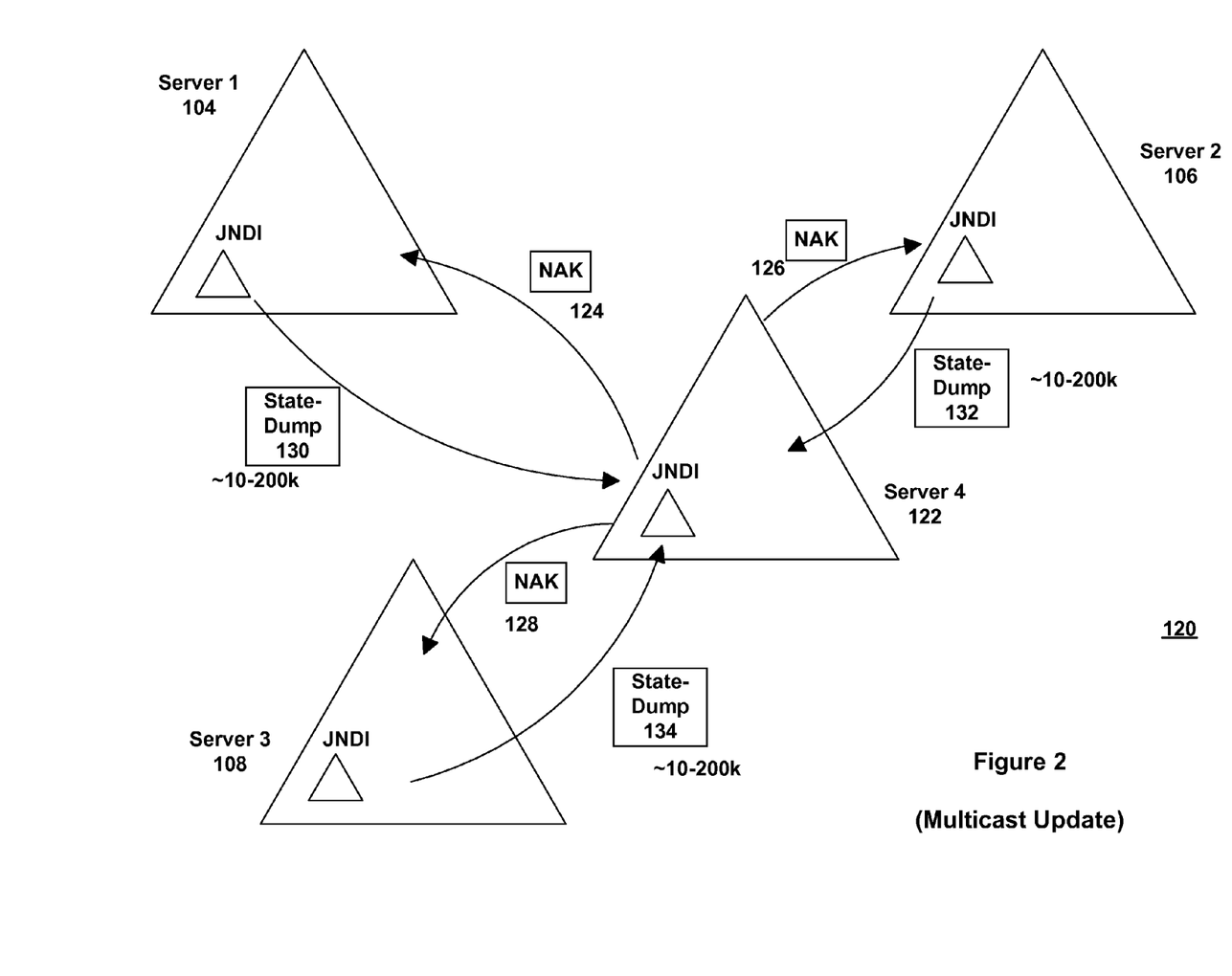
FIG. 2 shows an illustration of a cluster-join mechanism between a new server and existing servers in a cluster, which uses multicast messaging.

FIG. 2 shows an illustration of a cluster-join mechanism 120 between a new server and existing servers in a cluster, which uses multicast messaging. As shown in FIG. 2, the joining server (server 4 (122)) must issue requests 124, 126, 128 to each other member in the cluster (server 1, server 2, and server 3), and then receive information as to the services offered by those servers. This results in a large transfer of data 130, 132, 134 to the joining server, and causes the initialize time to be lengthened, impacting the cluster stability and performance.

Figure 3:
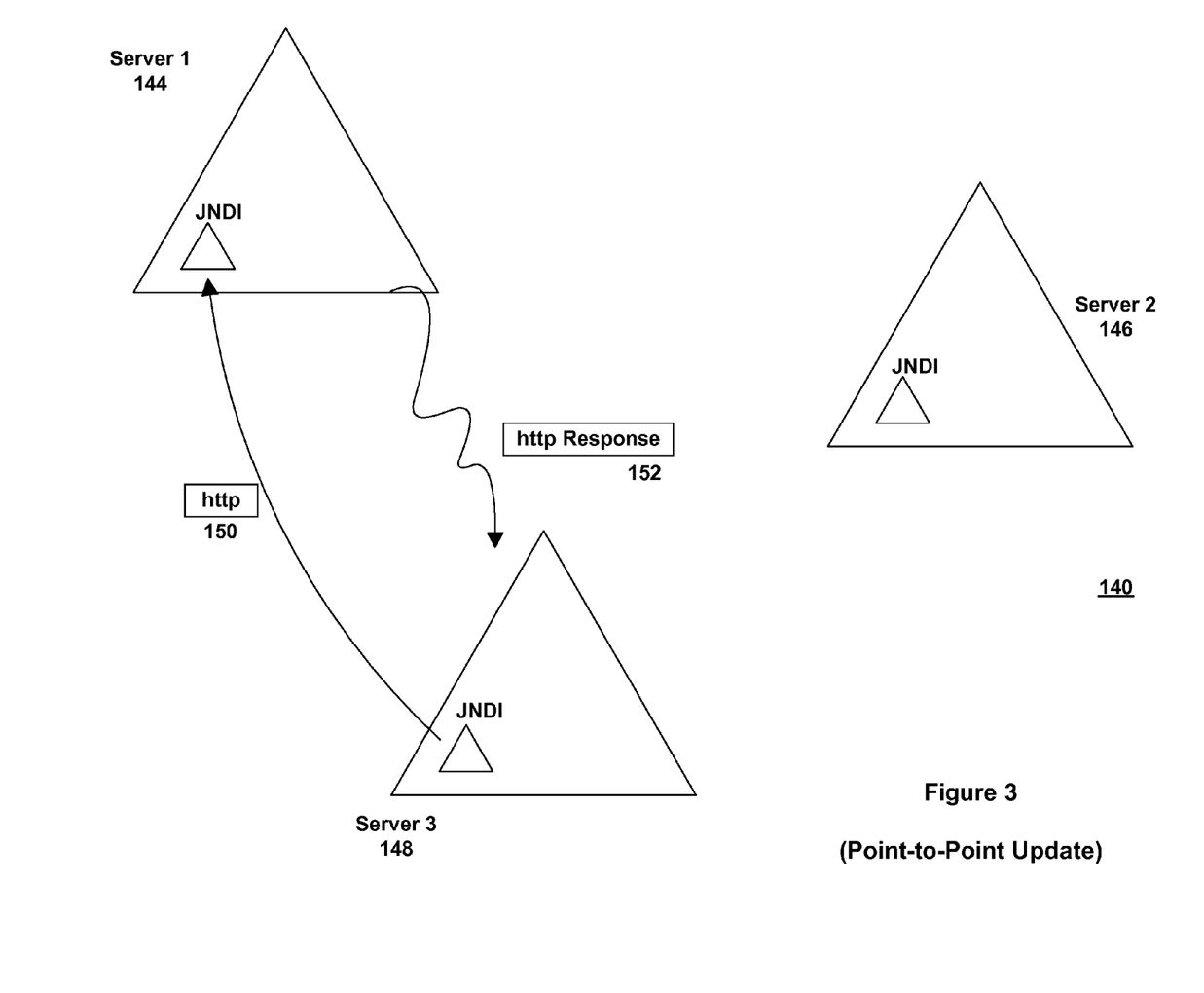
FIG. 3 shows an illustration of an update mechanism between servers in a cluster, which uses point-to-point messaging, in accordance with an embodiment of the invention.

FIG. 3 shows an illustration of an update mechanism 140 between servers in a cluster, which uses point-to-point messaging, in accordance with an embodiment of the invention. FIG. 3 illustrates how a first server in the cluster i.e. a first cluster member, in this example shown as server 3 (148), can issue a point-to-point request 150 to a second server in the cluster, i.e. a second cluster member, in this example shown as server 1 (144), requesting that the second server communicate an update of its naming service or JNDI tree, and the services defined thereby, to the first server. The first server can then update its own naming service accordingly. Fewer messages need be sent between the cluster members, and of those messages that do need to be sent fewer are of the larger statedump variety. The result is that message buffers are not likely to be overflowed, and the cluster is both more stable and more scalable.

In one embodiment the point-to-point request is made using an hypertext transfer protocol (http) request. Http is useful because it does not require a communication socket be kept open between the servers—instead, the http socket can be opened, the message sent, and the socket closed. This eliminates the need to maintain additional sockets on the servers, together with the additional overhead and reduced performance that would entail.

Each server in the cluster acts independently in this regard, i.e. each server makes its own determination as to whether its naming service is out-of-sync with a particular server. If it determines that it is out of sync, then the server makes its own point-to-point request to the particular server to receive an update and remedy the discrepancy.

Figure 4:
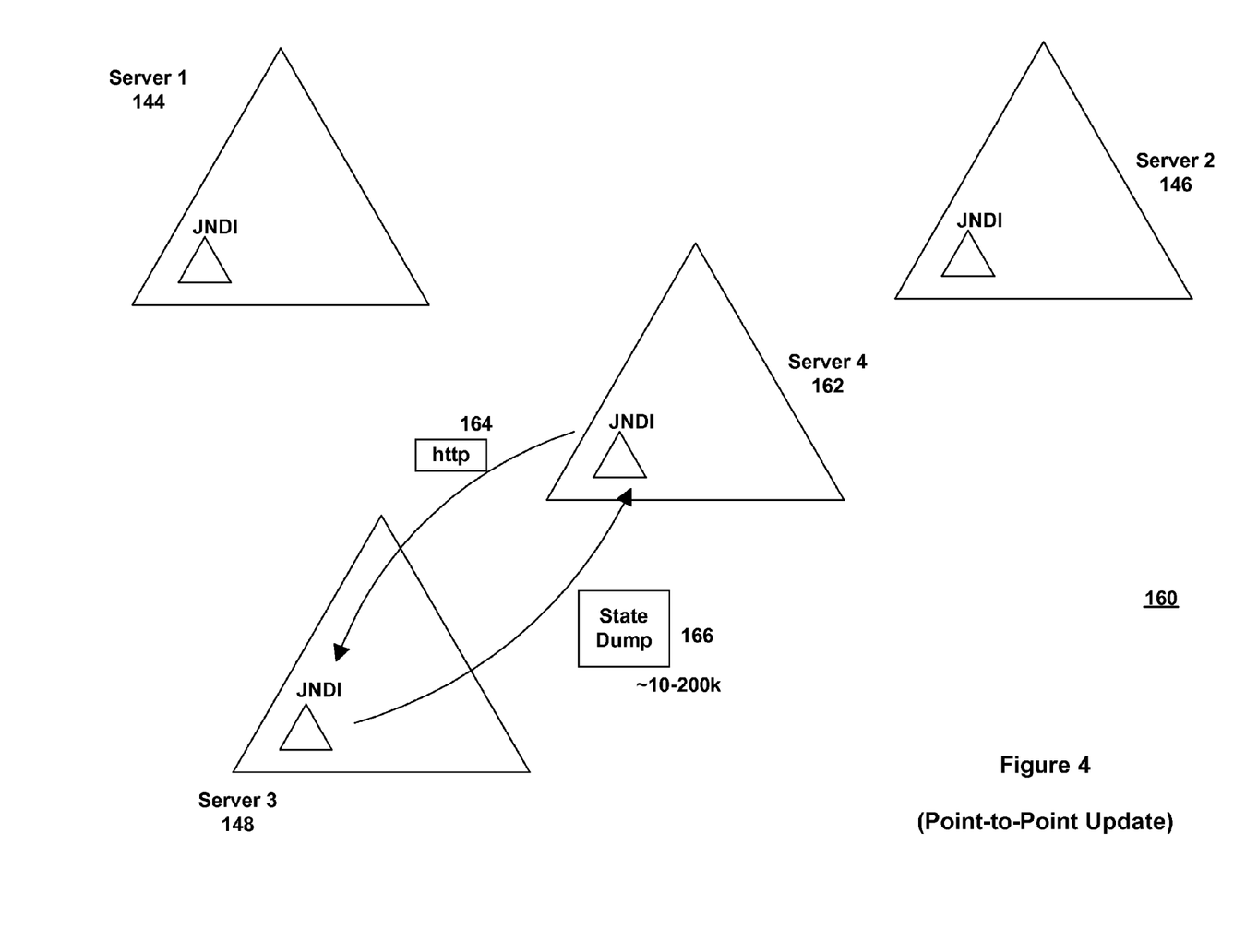
FIG. 4 shows an illustration of a cluster-join mechanism between a new server and existing servers in a cluster, which uses point-to-point messaging, in accordance with an embodiment of the invention.

FIG. 4 shows an illustration of a cluster-join mechanism 160 between a new server and existing servers in a cluster, which uses point-to-point messaging, in accordance with an embodiment of the invention. As shown in FIG. 4, the joining server (server 4 (162)), need only wait for a few seconds to see who else is in the cluster. The new server can then make a point-to-point or http request 164 to one node or member to receive 166 a copy or statedump of its naming service. There is no need to communicate directly with any of the other servers. The overall result is a reduction in the number of messages, together with corresponding better cluster stability, and shorter times for new members to be added into the cluster.

Figure 5:
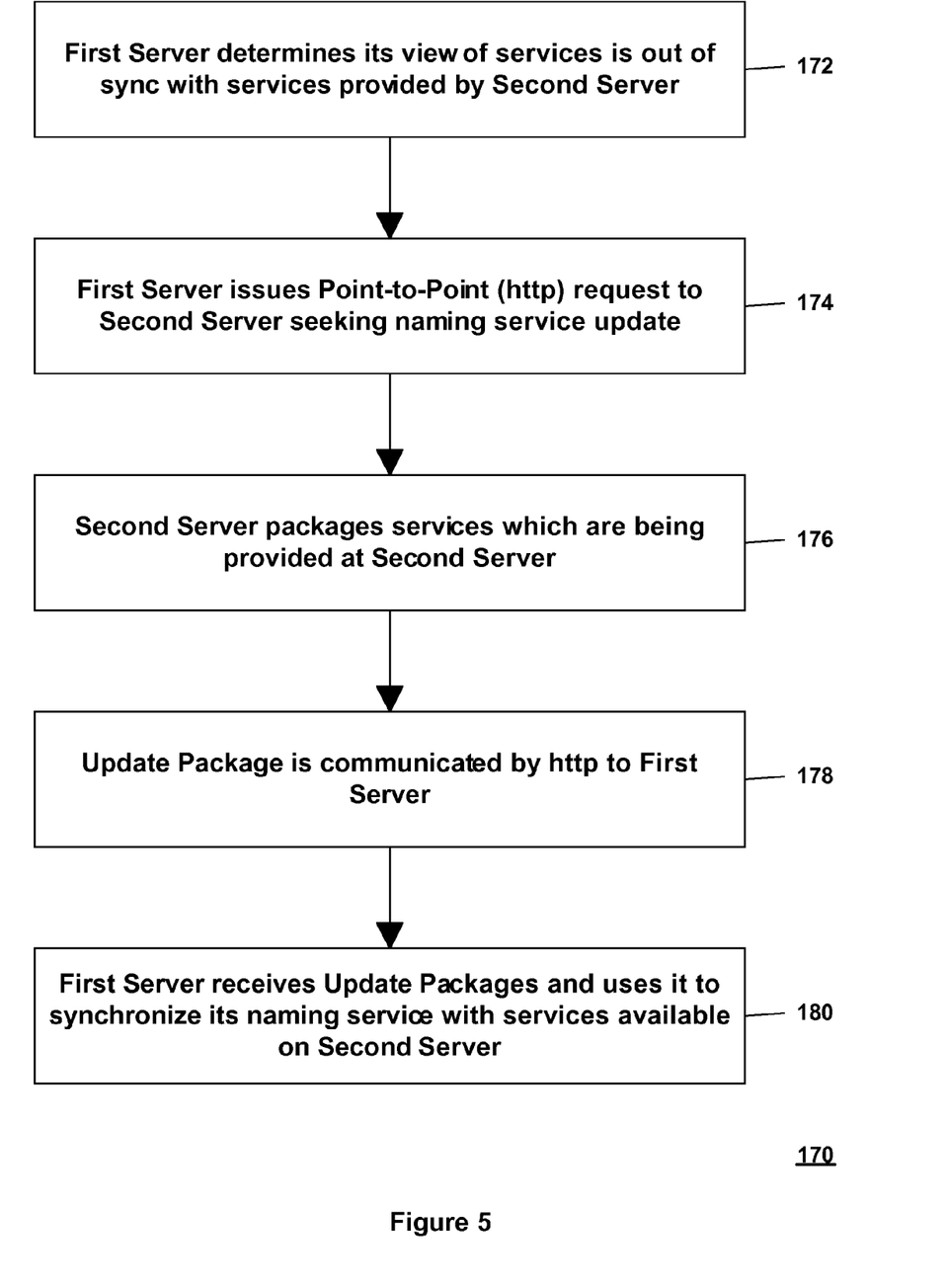
FIG. 5 shows a flowchart of a server communication process between a first and second server in a cluster, which uses point-to-point messaging, in accordance with an embodiment of the invention.

FIG. 5 shows a flowchart 170 of a server communication process between a first and second server in a cluster, which uses point-to-point messaging, in accordance with an embodiment of the invention. As listed in FIG. 5, a first step 172 in the process is for a first server in the cluster (i.e. a first cluster), to determine that its copy of the naming service or JNDI tree is out-of-sync with the services provided by a second server in the cluster (i.e. a second cluster member). In step 174, the first server issues a point-to-point request (in on embodiment an http request) to the second server, seeking a naming service update from that server. In step 176, the second server packages an update of all of its services and, in step 178, communicates the update to the first server. In step 180, the first server receives the update package and uses it to synchronize its naming service with the services available at the second server.

Code Implementation

The following code segments illustrate, by way of example, how the system can be provided to communicate information between cluster members, in a point-to-point fashion in accordance with one embodiment of the invention. It will be evident that additional implementations may be developed within the spirt and scope of the invention, and that the invention is not limited to the examples shown. The key points to note are that any system, application server, or server that incorporates or utilizes the invention, should support the following features:

The server should be able to handle http requests for updated information.

The server should know how to process the http request/response.

The server should recognize an out-of-sync condition, and act accordingly.

HTTPExecuteRequest.Java

```
package weblogic.cluster;
import java.io.DataInputStream;
import java.io.IOException;
import java.io.OutputStream;
import java.net.ConnectException;
import java.net.HttpURLConnection;
import java.net.ProtocolException;
import java.net.URL;
import java.security.AccessController;
import java.security.PrivilegedAction;
import weblogic.common.internal.WLObjectInputStream;
import weblogic.kernel.ExecuteRequest;
import weblogic.kernel.ExecuteThread;
import weblogic.kernel.Kernel;
```

-continued

```
import weblogic.protocol.Protocol;
import weblogic.protocol.ServerChannel;
import weblogic.rmi.spi.HostID;
import weblogic.security.acl.internal.AuthenticatedSubject;
import weblogic.security.service.PrivilegedActions;
import weblogic.security.service.SecurityServiceManager;
import weblogic.server.Server;
import weblogic.utils.Debug;
import weblogic.utils.StringUtils;
import weblogic.utils.UnsyncStringBuffer;
import weblogic.utils.io.DataIO;
/* package */ final class HTTPExecuteRequest implements ExecuteRequest {
    private HttpURLConnection con;
    private DataInputStream in;
    private final String request;
    private final ServerChannel srvrAddress;
    private final int senderNum;
    private final HostID memberID;
    private static AuthenticatedSubject kernelId = (AuthenticatedSubject)
            AccessController.doPrivileged(PrivilegedActions.getKernelIdentityAction( ));
    private static final boolean DEBUG = false;
    public HTTPExecuteRequest (ServerChannel srvrAddress, long lastSeqNum,
        int senderNum, HostID memberID
    ) {
        this.senderNum = senderNum;
        this.srvrAddress = srvrAddress;
        this.request = getHeader(srvrAddress, lastSeqNum);
        this.memberID = memberID;
    }
    private void connect( ) throws ConnectException, IOException {
        URL url = new URL("http", srvrAddress.getAddress( ), srvrAddress.getPort(
                        Protocol.PROTOCOL_HTTP), request);
        con = (HttpURLConnection) url.openConnection( );
        con.setDoInput(true);
        con.connect( );
        in = new DataInputStream(con.getInputStream( ));
    }
    public void execute(ExecuteThread thread) {
        if (DEBUG) {
            ClusterDebug.log("Request " + request + " to " + srvrAddress);
        }
        try {
            if (ClusterDebug.DEBUG &&
                    Server.getDebug( ).getDebugClusterAnnouncements( )) {
                ClusterLogger.logFetchServerStateDump(srvrAddress.getAddress( ));
            }
            connect( );
            if (con.getResponseCode( ) != 200)
                throw new IOException("Failed to get OK response");
            if (DEBUG) {
                ClusterDebug.log("GOT CONTENT LENGTH " + con.getContentLength( ));
            }
            byte[ ] b = readHttpResponse(in, con.getContentLength( ));
            WLObjectInputStream ois = MulticastManager.getInputStream(b);
            final MemberAttributes attributes = (MemberAttributes) ois.readObject( );
            processAttributes(attributes);
            final GroupMessage finalmsg = (GroupMessage) ois.readObject( );
            long currentSeqNum = ois.readLong( );
            // FIXME andyp 1-Aug-02 -- identity and addressing are different
            final HostID finalid = (HostID)srvrAddress;
            SecurityServiceManager.runAs(kernelId, kernelId,
                new PrivilegedAction( ) {
                    public Object run( ) {
                        finalmsg.execute(finalid);
                        return null;
                    }
                });
        } catch (ConnectException ce) {
            if (ClusterDebug.DEBUG &&
                    Server.getDebug( ).getDebugClusterAnnouncements( )) {
                ClusterLogger.logFailedWhileReceivingStateDump(srvrAddress.toString( ),
                        ce);
            }
        } catch (IOException ioe) {
            ClusterLogger.logFailedWhileReceivingStateDump(srvrAddress.toString( ),
                    ioe);
        } catch (ClassNotFoundException cnfe) {
            ClusterLogger.logFailedToDeserializeStateDump(srvrAddress.toString( ),
                    cnfe);
```

-continued

```
        } finally {
            try {
                if (in != null) in.close( );
            } catch (IOException ioe) { /* ignore */ }
            if (con != null) con.disconnect( );
            resetHTTPRequestDispatchFlag( );
        }
    }
}
private void resetHTTPRequestDispatchFlag( ) {
    RemoteMemberInfo info = MemberManager.theOne( ).findOrCreate(memberID);
    HybridMulticastReceiver receiver = (HybridMulticastReceiver)
        info.findOrCreateReceiver(senderNum, true);
    receiver.setHttpRequestDispatched(false);
    MemberManager.theOne( ).done(info);
}
private String getHeader(ServerChannel address, long lastSeqNum) {
    UnsyncStringBuffer sb = new UnsyncStringBuffer( );
    sb.append("/bea__wls__internal/psquare/p2.jsp?senderNum=");
    sb.append(senderNum);
    sb.append("&lastSeqNum=");
    sb.append(lastSeqNum);
    sb.append(" ");
    return sb.toString( );
}
private byte[ ] readHttpResponse(DataInputStream is, int contentLength)
    throws IOException, ProtocolException
{
    byte [ ] b = new byte[contentLength];
    DataIO.readFully(is, b);
    return b;
}
private void processAttributes(MemberAttributes attributes) {
    RemoteMemberInfo info = MemberManager.theOne( ).findOrCreate(
        attributes.identity( ));
    info.processAttributes(attributes);
    MemberManager.theOne( ).done(info);
}
}
```

35

HybridMulticastReceiver

```
package weblogic.cluster;
import java.io.DataInputStream;
import java.io.IOException;
import java.io.OutputStream;
import java.net.ProtocolException;
import java.net.Socket;
import java.security.AccessController;
import java.security.PrivilegedAction;
import weblogic.common.internal.WLObjectInputStream;
import weblogic.kernel.ExecuteRequest;
import weblogic.kernel.ExecuteThread;
import weblogic.kernel.Kernel;
import weblogic.protocol.Protocol;
import weblogic.protocol.ServerChannel;
import weblogic.rmi.spi.HostID;
import weblogic.security.acl.internal.AuthenticatedSubject;
import weblogic.security.service.PrivilegedActions;
import weblogic.security.service.SecurityServiceManager;
import weblogic.server.Server;
import weblogic.utils.Debug;
import weblogic.utils.StringUtils;
import weblogic.utils.UnsyncStringBuffer;
import weblogic.utils.io.DataIO;
/**
 * A MulticastReceiver assembles in-coming GroupMessages from a
 * MulticastSender and executes them in order. At any point in time,
 * there is a current message that it is assembling. Fragments for
 * this message are assumed to be lost whenever either a heartbeat or
 * a fragment arrives with a sequence number that is beyond this
 * message's sequence number. The MulticastReceiver sends NAKs
 * only with respect to this message. Fragments for future messages
 * are kept in a fixed-size cache and are dealt with as each becomes
```

-continued

```
 * current.
 *
 * A MulticastSender can be configured to provide "pretty-reliable"
 * delivery or best-effort delivery. It communicates this to the
 * MulticastReceiver by sending the retryEnabled flag (true means
 * pretty-reliable delivery). If it is false, the pair does not
 * engage in the Heartbeat retry protocol. The MulticastReceiver
 * still uses the cache, so that mis-ordered fragments can be handled,
 * however it freely drops the current message as needed to make
 * progress.
 *
 * SYNCHRONIZATION NOTES: There are three ways into a MulticastReceiver.
 * - dispatch( ) to handle an incoming fragment
 * - processLastSeqNum( ) to handle an incoming LastSeqNum from a Heartbeat
 * - shutdown( ) to shut things down.
 * All are synchronized to protect the local variables.
 *
 * @author Copyright (c) 1996-98 by WebLogic, Inc. All Rights Reserved.
 * @author Copyright (c) 1999-2000 by BEA WebXpress. All Rights Reserved.
 */
public class HybridMulticastReceiver extends MulticastReceiver {
    private final static boolean DEBUG = ClusterDebug.DEBUG &&
        Server.getDebug( ).getDebugClusterAnnouncements( );
    private boolean httpReqDispatched; //HTTP Request dispatched to get statedump
    private ServerChannel srvrAddress;
    private int senderNum;
    private int queueIndex;
    private final HostID memberID;
    private static AuthenticatedSubject kernelId = (AuthenticatedSubject)
        AccessController.doPrivileged(PrivilegedActions.getKernelIdentityAction( ));
    /*package*/ HybridMulticastReceiver(HostID memberID, int senderNum) {
        this(memberID, senderNum, Kernel.getDispatchPolicyIndex(
                Kernel.SYSTEM_DISPATCH));
    }
    // The following constructor should be used if you want request processed
    // by specific queue in the kernel.
    /*package*/ HybridMulticastReceiver(
        HostID memberID,
        int senderNum,
        int queueIndex
    ) {
        super(memberID, senderNum, queueIndex);
        srvrAddress = (ServerChannel) memberID;
        this.senderNum = senderNum;
        this.queueIndex = queueIndex;
        this.memberID = memberID;
    }
    /* package */ void processLastSeqNum(long lastSeqNum) {
        if (lastSeqNum >= currentSeqNum) {
            fetchStateDumpOverHttp(lastSeqNum);
        }
    }
    /* package */ void setInSync(int lastSeqNum) {
        synchronized(this) {
            httpReqDispatched = false;
            super.setInSync(lastSeqNum);
        }
    }
    /* package */ void setHttpRequestDispatched(boolean b) {
        synchronized(this) {
            httpReqDispatched = false;
        }
    }
    private void fetchStateDumpOverHttp(long lastSeqNum) {
        if (httpReqDispatched) return;
        synchronized(this) {
            httpReqDispatched = true;
        }
        HTTPExecuteRequest request = new HTTPExecuteRequest(
            srvrAddress, lastSeqNum, senderNum, memberID);
        Kernel.execute(request, queueIndex);
    }
}
```

MulticastSessionDataRecoveryServlet

```
package weblogic.cluster;
import java.io.IOException;
import java.io.OutputStream;
import java.util.ArrayList;
import java.util.HashMap;
import java.util.Iterator;
import javax.servlet.ServletException;
import javax.servlet.ServletInputStream;
import javax.servlet.http.HttpServlet;
import javax.servlet.http.HttpServletRequest;
import javax.servlet.http.HttpServletResponse;
import weblogic.common.internal.WLObjectOutputStream;
import weblogic.rmi.spi.HostID;
import weblogic.rmi.spi.RMIRuntime;
import weblogic.rmi.utils.io.RemoteObjectReplacer;
import weblogic.utils.Debug;
import weblogic.utils.io.UnsyncByteArrayOutputStream;
/**
 * @author Copyright (c) 2002 by BEA WebXpress. All Rights Reserved.
 */
public final class MulticastSessionDataRecoveryServlet extends HttpServlet
{
    private final static boolean DEBUG = false;
    private final static int DEFAULT_BUF_SIZE = 10 * 1024;
    public void doGet(HttpServletRequest req, HttpServletResponse res)
            throws ServletException, IOException
    {
        String senderNumAsString = req.getPararaeter("senderNum");
        String lastSeqNumAsString = req.getParameter("lastSeqNum");
        if (DEBUG) {
            ClusterDebug.log("Nak request for senderNum " + senderNumAsString);
            ClusterDebug.log("Last seq num " + lastSeqNumAsString);
        }
        int senderNum = Integer.valueOf(senderNumAsString).intValue( );
        int lastSeqNum = Integer.valueOf(lastSeqNumAsString).intValue( );
        UnsyncByteArrayOutputStream baos = null;
        WLObjectOutputStream oos = null;
        OutputStream out = null;
        try {
            baos = new UnsyncByteArrayOutputStream(DEFAULT_BUF_SIZE);
            oos = new WLObjectOutputStream(baos);
            oos.setReplacer(new MulticastReplacer(RMIRuntime.getLocalHostID( )));
            MulticastSender sender = MulticastManager.theOne( ).findSender(senderNum);
            if (DEBUG) {
                ClusterDebug.log("SENDER " + sender + " CURRENT SEQ NUM "
                    + sender.getCurrentSeqNum( ));
            }
            GroupMessage msg = sender.createRecoverMessage( );
            oos.writeObject(AttributeManager.theOne( ).getLocalAttributes( ));
            oos.writeObject(msg);
            oos.writeLong(sender.getCurrentSeqNum( ));
            oos.flush( );
            res.setContentType("application/unknown");
            out = res.getOutputStream( );
            res.setContentLength(baos.size( ));
            if (DEBUG) {
                ClusterDebug.log("WRITING BYTES OF SIZE " + baos.size( ));
            }
            baos.writeTo(out);
            out.flush( );
        } finally {
            try {
                if (baos != null) { baos.close( ); }
            } catch (IOException ioe) { }
            try {
                if (out != null) { out.close( ); }
            } catch (IOException ioe) { }
            try {
                if (oos != null) { oos.close( ); }
            } catch (IOException ioe) { }
        }
    }
}
```

StateDumpServlet

```java
package weblogic.cluster;
import java.io.ByteArrayOutputStream;
import java.io.IOException;
import java.io.OutputStream;
import java.security.AccessController;
import java.security.PrivilegedAction;
import java.util.ArrayList;
import java.util.HashMap;
import java.util.Iterator;
import javax.servlet.ServletException;
import javax.servlet.ServletInputStream;
import javax.servlet.http.HttpServlet;
import javax.servlet.http.HttpServletRequest;
import javax.servlet.http.HttpServletResponse;
import weblogic.common.internal.WLObjectInputStream;
import weblogic.common.internal.WLObjectOutputStream;
import weblogic.rmi.spi.HostID;
import weblogic.rmi.spi.RMIRuntime;
import weblogic.rmi.utils.io.RemoteObjectReplacer;
import weblogic.security.acl.internal.AuthenticatedSubject;
import weblogic.security.service.PrivilegedActions;
import weblogic.security.service.SecurityServiceManager;
import weblogic.server.Server;
import weblogic.utils.Debug;
import weblogic.utils.io.DataIO;
/**
 * @author Copyright (c) 2002 by BEA WebXpress. All Rights Reserved.
 */
public final class StateDumpServlet extends HttpServlet implements
MulticastSessionIDConstants
    {
        private final static boolean DEBUG = ClusterDebug.DEBUG &&
            Server.getDebug( ).getDebugClusterAnnouncements( );
    private final static int DEFAULT_BUF_SIZE = 10 * 1024;
    private static AuthenticatedSubject kernelId = (AuthenticatedSubject)
        AccessController.doPrivileged(PrivilegedActions.getKernelIdentityAction( ));
    public void doGet(HttpServletRequest req, HttpServletResponse res)
            throws ServletException, IOException
    {
        ByteArrayOutputStream baos = null;
        WLObjectOutputStream oos = null;
        OutputStream out = null;
        try {
            baos = new ByteArrayOutputStream(DEFAULT_BUF_SIZE);
            oos = new WLObjectOutputStream(baos);
            ArrayList list = (ArrayList) MemberManager.theOne( ).getRemoteMembers( );
            if (DEBUG) {
                ClusterDebug.log("Sending statedump for " + (list.size( ) + 1)+ " servers");
            }
            oos.writeInt(list.size( ));
            for (int i = 0; i < list.size( ); i++) {
                MemberAttributes attr = (MemberAttributes) list.get(i);
                RemoteMemberInfo memInfo = MemberManager.theOne( ).findOrCreate(
                    attr.identity( ));
                HostID hostID = memInfo.getAttributes( ).identity( );
                oos.setReplacer(new MulticastReplacer (hostID));
                oos.writeObjectWL(memInfo.getAttributes( ));
                oos.writeObject(new
                    StateDumpMessage(memInfo.getMemberServices( ).getAllOffers( ),
                        ANNOUNCEMENT_MANAGER_ID,
                        memInfo.findOrCreateReceiver(ANNOUNCEMENT_MANAGER_ID, true
                    ).getCurrentSeqNum( )));
                if (DEBUG) {
                            ClusterDebug.log("Sending  offers  of  size  " +
memInfo.getMemberServices( ).getAllOffers( ).size( ) + " of " + hostID);
                }
                MemberManager.theOne( ).done(memInfo);
            }
            oos.setReplacer(new MulticastReplacer(RMIRuntime.getLocalHostID( )));
            oos.writeObject(AttributeManager.theOne( ).getLocalAttributes( ));
            oos.writeObject(AnnouncementManager.theOne( ).createRecoverMessage( ));
            oos.flush( );
            res.setContentType("application/unknown");
            out = res.getOutputStream( );
            if (DEBUG) {
                ClusterDebug.log("WRITING DATA OF SIZE " + baos.size( ));
            }
```

```
            res.setContentLength(baos.size( ));
            baos.writeTo(out);
            out.flush( );
        } finally {
            try {
                if (baos != null) baos.close( );
            } catch (IOException ioe) { }
            try {
                if (oos != null) oos.close( );
            } catch (IOException ioe) { }
            try {
                if (out != null) out.close( );
            } catch (IOException ioe) { }
        }
    }
}
```

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the invention may be used in a WebLogic environment, other application servers, servers, server clusters, and computing environments, may use and benefit from the invention. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for communicating information about server resources between servers in a cluster, the system comprising:
one or more computers;
a server cluster, run on said one or more computers, having a plurality of cluster members, including a first cluster member and a second cluster member;
a set of resources or services on said first cluster member that can be used by other cluster members in the server cluster;
wherein said first cluster member sends an advertisement of the services to the other cluster members,
wherein if said second cluster member determines said second cluster member is out of synchronization with said first cluster member, or missed the advertisement, said second cluster member makes a Hypertext Transfer Protocol (HTTP) point-to-point request to said first cluster member requesting the advertisement missed;
wherein said first cluster member responds to said HTTP point-to-point request by sending a HTTP point-to-point response including an update of Java Naming and Directory Interface (JNDI) tree of said first cluster member to said second cluster member.

2. The system of claim 1 wherein each member of the cluster receives the advertisement, but those members who do not need to be updated ignore the advertisement.

3. The system of claim 1 wherein a third cluster member is newly added to the cluster, and wherein said third cluster member waits for advertisements from said plurality of cluster members and then makes HTTP point-to-point requests to each cluster member requesting advertisements said third cluster member missed from that particular cluster member.

4. The system of claim 1 wherein the determination as to whether the second cluster member is out of synchronization with said first cluster member, or missed an advertisement, is made by determining that the first cluster member's JNDI tree is out of synchronization with the second cluster member's JNDI tree.

5. The system of claim 4 wherein the receipt of updated information at said second cluster member is used to synchronize said second cluster member's internal JNDI tree with the resources provided at said first cluster member.

6. The system of claim 1 wherein as part of the advertisement the first cluster member packages a JNDI update of the services and multicasts the package to all cluster members.

7. The system of claim 1 wherein a third cluster member is newly added to the server cluster, and wherein said third cluster member waits for advertisements from said plurality of cluster members and then makes a HTTP point-to-point request to a single cluster member requesting a statedump from said single cluster member.

8. The computer readable medium of claim 1 wherein a third cluster member is newly added to the server cluster, and wherein said third cluster member waits for advertisements from other cluster members and then makes a HTTP point-to-point request to a single cluster member requesting a statedump from said single cluster member.

9. The system of claim 1 wherein making a HTTP point-to-point request comprises opening a communication socket, sending the HTTP point-to-point request, and closing the communication socket.

10. A method of communicating information about server resources between servers in a cluster, the method comprising the steps of:
   providing a server cluster including a first cluster member and a second cluster member, and resources operating thereon;
   sending an advertisement from said first cluster member to other cluster members in the server cluster announcing the resources or services on said first cluster member;
   subsequently, if said second cluster member determines said second cluster member is out of synchronization with said first cluster member, or missed the advertisement, making a Hypertext Transfer Protocol (HTTP) point-to-point request from said second cluster member to said first cluster member requesting the advertisement missed;
   receiving a HTTP point-to-point response including an update of Java Naming and Directory Interface (JNDI) tree of said first cluster member from said first cluster member at said second cluster member and updating said second cluster member accordingly.

11. The method of claim 10 wherein each member of the cluster receives the advertisement, but those members who do not need to be updated ignore the advertisement.

12. The method of claim 10 wherein a third cluster member is newly added to the cluster, and wherein said third cluster member waits for advertisements from other cluster members and then makes HTTP point-to-point requests to each cluster member requesting advertisements said third cluster member missed from that particular cluster member.

13. The method of claim 10 wherein the determination as to whether the second cluster member is out of synchronization with said first cluster member, or missed an advertisement, is made by determining that the first cluster member's JNDI tree is out of synchronization with the second cluster member's JNDI tree.

14. The method of claim 13 wherein the receipt of updated information at said second cluster member is used to synchronize said second cluster member's internal JNDI tree with the resources provided at said first cluster member.

15. The system of claim 10 wherein as part of the advertisement the first cluster member packages a JNDI update of all if its services and multicasts the package to all cluster members.

16. The method of claim 10 wherein a third cluster member is newly added to the server cluster, and wherein said third cluster member waits for advertisements from other cluster members and then makes a HTTP point-to-point request to a single cluster member requesting a statedump from said single cluster member.

17. The method of claim 10 wherein making a HTTP point-to-point request comprises opening a communication socket, sending the HTTP point-to-point request, and closing the communication socket.

18. A computer readable medium including instructions stored thereon which when executed cause a computer or computers to perform the steps of:
   providing a server cluster including a first cluster member and a second cluster member, and resources operating thereon;
   sending an advertisement from said first cluster member to other cluster members in the server cluster announcing the resources or services on said first cluster member;
   subsequently, if said second cluster member determines said second cluster member is out of synchronization with said first cluster member, or missed the advertisement, making a Hypertext Transfer Protocol (HTTP) point-to-point request from said second cluster member to said first cluster member requesting the advertisement missed;
   receiving a HTTP point-to-point response including an update of Java Naming and Directory Interface (JNDI) tree of said first cluster member from said first cluster member at said second cluster member and updating said second cluster member accordingly.

19. The computer readable medium of claim 18 wherein each member of the cluster receives the advertisement, but those members who do not need to be updated ignore the advertisement.

20. The computer readable medium of claim 18 wherein a third cluster member is newly added to the cluster, and wherein said third cluster member waits for advertisements from other cluster members and then makes HTTP point-to-point requests to each cluster member requesting advertisements said third cluster member missed from that particular cluster member.

21. The computer readable medium of claim 18 wherein the determination as to whether the second cluster member is out of synchronization with said first cluster member, or missed an advertisement, is made by determining that the first cluster member's JNDI tree is out of synchronization with the second cluster member's JNDI tree.

22. The computer readable medium of claim 21 wherein the receipt of updated information at said second cluster member is used to synchronize said second cluster member's internal JNDI tree with the resources provided at said first cluster member.

23. The computer readable medium of claim 18 wherein as part of the advertisement the first cluster member packages a JNDI update of all if its services and multicasts the package to all cluster members.

24. The computer readable medium of claim 18 wherein making a HTTP point-to-point request comprises opening a communication socket, sending the HTTP point-to-point request, and closing the communication socket.

* * * * *

UNITED STATES PATENT AND TRADEMARK OFFICE
CERTIFICATE OF CORRECTION

PATENT NO. : 7,376,754 B2  Page 1 of 1
APPLICATION NO. : 10/789138
DATED : May 20, 2008
INVENTOR(S) : Peddada It is certified that error appears in the above-identified patent and that said Letters Patent is hereby corrected as shown below:

In column 3, line 29, delete "mutlicast" and insert -- multicast --, therefor.

In column 5, line 42, delete "an" and insert -- a --, therefor.

In column 6, line 40, delete "spirt" and insert -- spirit --, therefor.

In column 13, line 29, delete "Pararaeter" and insert -- Parameter --, therefor.

In column 18, line 23, in claim 1, delete "members," and insert -- members; --, therefor.

Signed and Sealed this

Second Day of February, 2010

David J. Kappos
*Director of the United States Patent and Trademark Office*